US012551891B2

(12) United States Patent
Froberg et al.

(10) Patent No.: US 12,551,891 B2
(45) Date of Patent: Feb. 17, 2026

(54) VESICLE BASED DNA DATA STORAGE

(71) Applicant: Seagate Technology LLC, Fremont, CA (US)

(72) Inventors: James Froberg, Shakopee, MN (US); Gemma Mendonsa, Edina, MN (US)

(73) Assignee: Seagate Technology LLC, Fremont, CA (US)

( * ) Notice: Subject to any disclaimer, the term of this patent is extended or adjusted under 35 U.S.C. 154(b) by 960 days.

(21) Appl. No.: 17/677,932

(22) Filed: Feb. 22, 2022

(65) Prior Publication Data

US 2023/0090248 A1 Mar. 23, 2023

Related U.S. Application Data

(60) Provisional application No. 63/247,024, filed on Sep. 22, 2021.

(51) Int. Cl.
*B01L 3/00* (2006.01)

(52) U.S. Cl.
CPC . *B01L 3/502761* (2013.01); *B01L 2200/0663* (2013.01); *B01L 2300/021* (2013.01);
(Continued)

(58) Field of Classification Search
CPC ....... B01L 3/502761; B01L 2200/0663; B01L 2300/021; B01L 2300/0645;
(Continued)

(56) References Cited

U.S. PATENT DOCUMENTS

| | | | |
|---|---|---|---|
| 6,287,825 B1 | 9/2001 | Weissman et al. |
| 9,315,846 B2 | 4/2016 | Pascoguin et al. |

(Continued)

FOREIGN PATENT DOCUMENTS

WO 2016065300 A1 4/2016

OTHER PUBLICATIONS

Xu, X. et al., "DNA-Programmed Chemical Synthesis of Polymers and Inorganic Nanomaterials," Topics in Current Chemistry (2020) 378:31, published online Mar. 7, 2020.

(Continued)

*Primary Examiner* — Brian J. Sines
(74) *Attorney, Agent, or Firm* — Westman, Champlin & Koehler, P.A.

(57) ABSTRACT

A microfluidic system includes a hydrophobic fluidic platform and a heater. The platform includes a plurality of electrode cells operably connected to a voltage source and a controller. The heater is configured to fuse first and second vesicles. The first and second vesicles encapsulate first and second DNA precursors, respectively. The fusing combines the first and second DNA precursors. In another embodiment, a microfluidic system includes a fluidic platform including a plurality of electrode cells, a vesicle mover, and a reaction facilitator. The vesicle mover is configured to move first and second vesicles to a selected cell of the plurality of electrode cells. The reaction facilitator is operably connected to the selected cell. A method includes providing a fluidic platform comprising a plurality of cells; moving first and second vesicles encapsulating first and second reagents, respectively, to a first cell; and fusing the first and second vesicles.

10 Claims, 4 Drawing Sheets

(52) U.S. Cl.
CPC .................. *B01L 2300/0645* (2013.01); *B01L 2300/0654* (2013.01); *B01L 2300/165* (2013.01); *B01L 2300/18* (2013.01)

(58) Field of Classification Search
CPC ....... B01L 2300/0654; B01L 2300/165; B01L 2300/18; B01L 2400/0424; B01L 3/502792; B01L 2200/0668; B01L 2200/16; B01L 2300/0819; B01L 2300/0867; B01L 2300/1827; B01L 2400/0427
See application file for complete search history.

(56) References Cited

U.S. PATENT DOCUMENTS

| | | | | |
|---|---|---|---|---|
| 10,260,064 | B2 | 4/2019 | Karig et al. | |
| 10,260,087 | B2 | 4/2019 | Coll Mulet et al. | |
| 11,939,570 | B2 * | 3/2024 | Rausch | B01L 3/5027 |
| 2005/0121604 | A1 * | 6/2005 | Mueth | A61M 1/3681 250/251 |
| 2006/0141626 | A1 | 6/2006 | Hauge et al. | |
| 2007/0196834 | A1 | 8/2007 | Cerrina et al. | |
| 2011/0124049 | A1 | 5/2011 | Li et al. | |
| 2016/0016169 | A1 * | 1/2016 | Ben-Yakar | B01L 3/502738 506/40 |
| 2017/0356477 | A1 | 12/2017 | Anand et al. | |
| 2019/0117571 | A1 | 4/2019 | Bixner et al. | |
| 2020/0215193 | A1 | 7/2020 | Weitz et al. | |
| 2021/0054364 | A1 | 2/2021 | Rausch et al. | |
| 2021/0054368 | A1 | 2/2021 | Rausch et al. | |
| 2021/0054447 | A1 | 2/2021 | Chang | |

OTHER PUBLICATIONS

Luo, R. et al., "DNA-Based Assembly of Multi-Compartment Polymersome Networks," Advanced Functional Materials 2020, 30, 2003480, published online Sep. 6, 2020.

Lefley, J. et al., "Macromolecular design and preparation of polymersomes," Polymer Chemistry 2020, 11, 7124-7136, published online Oct. 19, 2020.

Abstract only: Helmerson, K. et al., "Optical manipulation of nanocontainers for biotechnology," Proc. SPIE 5514, Optical Trapping and Optical Micromanipulation (Oct. 18, 2004).

* cited by examiner

VESICLE BASED DNA DATA STORAGE

CROSS-REFERENCE TO RELATED APPLICATION(S)

This application claims the benefit of U.S. provisional application No. 63/247,024, filed on Sep. 22, 2021, the content of which is hereby incorporated by reference in its entirety.

SUMMARY

In one embodiment, a microfluidic system comprises a hydrophobic fluidic platform and a heater. The platform comprises a plurality of electrode cells operably connected to a voltage source and a controller for the voltage source. The heater on the platform is configured to fuse first and second vesicles. The first vesicle encapsulates a first DNA precursor and the second vesicle encapsulates a second DNA precursor. The fusing combines the first and second DNA precursors.

In another embodiment, a microfluidic system comprises a fluidic platform comprising a plurality of electrode cells, a vesicle mover, and a reaction facilitator. The vesicle mover is configured to move first and second vesicles to a selected cell of the plurality of electrode cells, the first vesicle encapsulating a first reagent and the second vesicle encapsulating a second reagent. The reaction facilitator is operably connected to the selected cell.

In yet another embodiment, a method comprises providing a fluidic platform comprising a plurality of cells arranged in an array; moving a first vesicle encapsulating a first reagent to a first cell of the plurality of cells; moving a second vesicle encapsulating a second reagent to the first cell; and fusing the first and second vesicles to form a third larger vesicle containing the first and second reagents.

Other features and benefits that characterize embodiments of the disclosure will be apparent upon reading the following detailed description and review of the associated drawings.

Figure 1A:
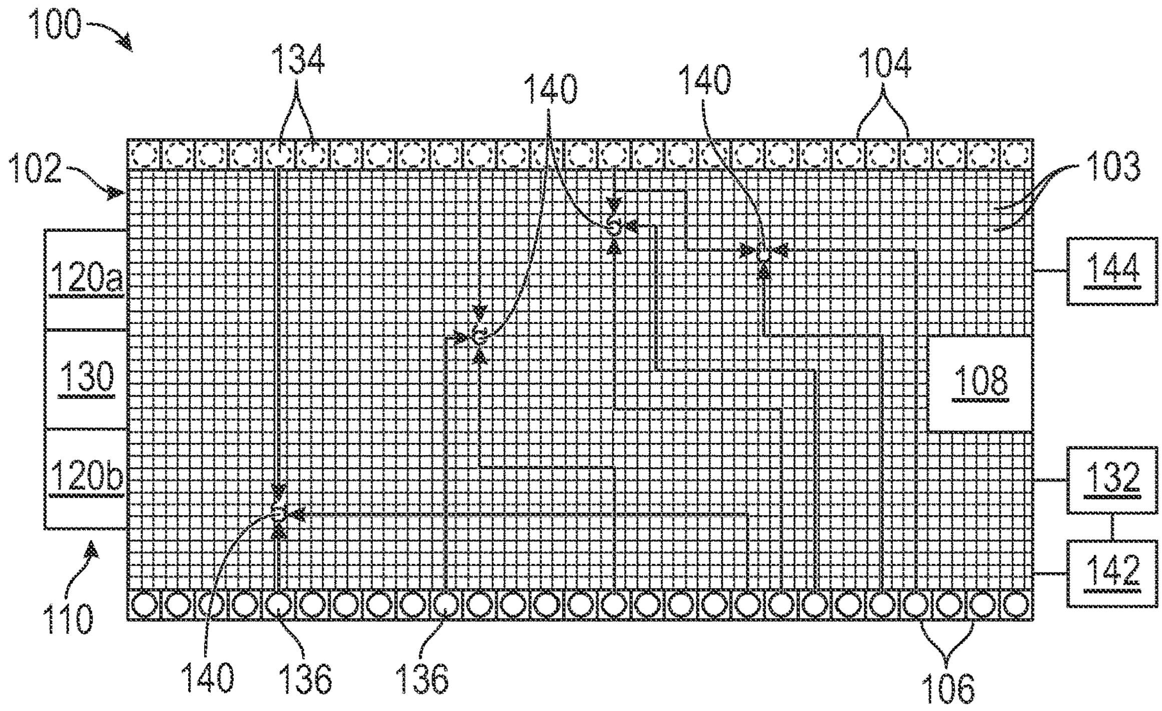
FIG. 1A is a schematic diagram of a lab-on-a-chip showing a stage in a method of making a data storage gene.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art that fall within the scope of the principles of this disclosure.

The figures may not be drawn to scale. In particular, some features may be enlarged relative to other features for clarity. Moreover, where terms such as above, below, over, under, top, bottom, side, right, left, vertical, horizontal, etc., are used, it is to be understood that they are used for ease of understanding the description. It is contemplated that structures may be oriented otherwise.

DETAILED DESCRIPTION OF ILLUSTRATIVE EMBODIMENTS

Commonly known data storage devices utilize magnetic storage media, such as hard disks. The storage capacity of hard disk drives (HDDs) has steadily increased due to an increase in areal density provided by such technological advances as perpendicular recording, shingled magnetic recording (SMR), heat-assisted magnetic recording (HAMR), interleaved magnetic recording (IMR), microwave-assisted magnetic recording (MAMR), and helium filling, for example. There is an ongoing desire for more data storage and increased writing to and reading from that storage. Deoxyribonucleic acid (DNA) is an emerging technology for data storage because of its ability to store biological, such as genetic, information. There is interest in building DNA strands, or genes, more quickly.

The drawing figures show illustrative operating environments in which certain embodiments disclosed herein may be incorporated. The operating environment shown in the drawings are for illustration purposes only; the described systems and methods can be practiced within any number of different types of operating environments.

It should be noted that the same reference numerals are used in different figures for the same or similar elements. All descriptions of an element also apply to all other versions of that element unless otherwise stated. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, “first,” “second,” and “third” elements or steps need not necessarily appear in that order, and the embodiments thereof need not necessarily be limited to three elements or steps. It should also be understood that, unless indicated otherwise, any labels such as “left,” “right,” “front,” “back,” “top,” “bottom,” “forward,” “reverse,” “clockwise,” “counter clockwise,” “up,” “down,” or other similar terms such as “upper,” “lower,” “aft,” “fore,” “vertical,” “horizontal,” “proximal,” “distal,” “intermediate” and the like are used for convenience and are not intended to imply, for example, any particular fixed location, orientation, or direction. Instead, such labels are used to reflect, for example, relative location, orientation, or directions. It should also be understood that the singular forms of “a,” “an,” and “the” include plural references unless the context clearly dictates otherwise.

It will be understood that, when an element is referred to as being “connected,” “coupled,” or “attached” to another element, it can be directly connected, coupled or attached to the other element, or it can be indirectly connected, coupled, or attached to the other element where intervening or intermediate elements may be present. In contrast, if an element is referred to as being “directly connected,” “directly coupled” or “directly attached” to another element, there are no intervening elements present. Drawings illustrating direct connections, couplings or attachments between elements also include embodiments, in which the elements are indirectly connected, coupled or attached to each other.

In general, embodiments of the disclosure relate to microfluidic systems and operations, such as those used for a lab-on-a-chip, useful for processing reactions at a high rate, on a small scale. In synthesizing a DNA gene or performing another chemical reaction on a lab-on-a-chip, cross contamination can be a significant problem, especially if paths are overlapping between chemicals, symbols, or linkers, or when surfaces are shared between multiple mixtures. Thus, embodiments of the disclosure use vesicle encapsulation of reagents to prevent unwanted or premature contact and to minimize chip contamination.

Lab-on-a-chip is a common term for an integrated circuit ("chip") on which one or several laboratory functions or chemical reactions are performed. The chip can have a form factor of a few square centimeters. Labs-on-a-chip handle extremely small fluid volumes (for example, measured as picoliters or femtoliters) and are often called microfluidic systems. In digital microfluidics (DMF), the lab-on-a-chip has a hydrophobic "chip platform" on which fluid droplets (e.g., liquid droplets) can be manipulated by controlled voltage application. The platform may have a cover plate covering the fluidic area. By utilizing the feature of surface tension of the fluid on the platform, the fluid can be moved across the platform by voltage applied to the platform, configured such as in a grid.

In exemplary embodiments, microfluidic labs-on-a-chip for a DNA gene system and for more general laboratory reactions are described. In exemplary embodiments, femtoliter ($10^{-15}$ liter (L)) scale droplets are encapsulated in a vesicle, such as a polymersome membrane, to contain reactants and prevent contamination. In exemplary embodiments, vesicles such as polymersomes are used as vehicles for transporting and controlling femtoliter scale droplets containing reactants used for writing DNA strands for DNA data storage and/or conducting other reactions using a digital microfluidic device. Vesicles such as polymersomes can be stimulated to release their contents by exposure to a variety of stimuli, such as ultraviolet (UV) light, high temperature, electric fields, the presence of certain enzymes, and hypoxia, for example. In one embodiment, multiple polymersomes, each carrying a DNA precursor, are combined together via exposure to UV light and/or heat. Thus, exemplary methods sequentially combine polymersomes containing DNA strands, linkers, and other chemistries used for writing DNA. Thus, DNA strands can be written using femtoliter volumes without contamination or evaporation.

The ability to adjust the polymersome wall also introduces the possibility of controlling the femtoliter droplets' location with a variety of different forces, or reducing the voltage to be utilized to control this volume with a traditional digital microfluidics electrode grid (a droplet held in spherical form has a smaller surface area, thereby reducing voltage for moving it). Additionally, magnetic nanoparticles can be incorporated into the polymersome spheres to allow directional control by use of a magnetic field. Moreover, adding charge to the polymersome material can make it more responsive to electric fields.

A lab-on-a-chip includes a hydrophobic fluidic platform comprising a plurality of cells arranged in an array, operably connected to a voltage source and a controller for the voltage source, a set of first wells or inlets operably connected to the fluidic platform, each first inlet for one DNA symbol from a DNA symbol library, a set of second wells or inlets operably connected to the fluidic platform, each second inlet for one DNA linker from a DNA linker library, and a mixing area operably connected to the fluidic platform and to the plurality of first inlets and the plurality of second inlets. The lab-on-a-chip can also include a polymerase chain reaction (PCR) station operably connected to the fluidic platform and to the plurality of first inlets and the plurality of second inlets, the PCR station comprising a well of PCR chemicals. In some implementations, the PCR chemicals include one primer.

Another particular implementation described herein is a method of synthesizing a DNA gene on a lab-on-a-chip. The method includes moving, via voltage, a plurality of DNA symbols from a first set of inlets and a plurality of DNA linkers from a second set of inlets across a hydrophobic fluidic platform and combining on the platform multiple ones of the plurality of DNA symbols with multiple twos of the plurality of DNA linkers to form multiple oligos, and moving, via voltage, the multiple oligos across the platform to form the gene in a mixing area. Additional information regarding use of the system for DNA synthesis is provided in the commonly owned published patent application US 2021/0054364 to Rausch et al., entitled "Microfluidic Lab-on-a-Chip for Gene Synthesis," which is incorporated herein by reference.

Various methods of building DNA strands or genes at a high rate are provided herein. The methods include utilizing libraries of pre-prepared oligos and mass parallelization to form the desired DNA structure or gene. If the gene is to be used as a data storage gene, the methods include assigning a bit pattern (e.g., 00, 01, 10, 11) to each nucleotide (A, C, G, T), thus providing a gene encoding the desired data. It is noted that the methods described herein are directed to synthesizing a data storage gene, however the same methods are applicable to other applications that warrant DNA synthesis.

For a data storage gene, each nucleotide is assigned a bit pattern. In one example, A=00, C=10, G=01, and T=11. Multiple nucleotides form an oligo, and multiple oligos can be combined to eventually form a gene. In accordance with a system described herein, multiple oligos are grouped in a library. An example of an oligo library is provided in Table 1, which lists pairs of nucleotides and a corresponding binary pattern.

TABLE 1

| DNA Oligo | Binary |
|---|---|
| AA | 0000 |
| AG | 0001 |
| AC | 0010 |
| AT | 0011 |
| GA | 0100 |
| GG | 0101 |
| GC | 0110 |
| GT | 0111 |
| CA | 1000 |
| CG | 1001 |
| CC | 1010 |
| CT | 1011 |
| TA | 1100 |
| TG | 1101 |
| TC | 1110 |
| TT | 1111 |

Using the example in Table 1 above. AA is 0000; the two base pair oligo stores 4 bits. As the oligo strand lengthens, more bits, bytes and data can be stored. For example, an oligo that is 8 base pairs long stores 16 bits, or 2 bytes. Using the example in Table 1, an oligo AATTAGTC is 0000111100011110, storing two bytes. It is noted that the example in Table 1 is an example of a primitive case and other bit mappings are possible where both the mapping and number of nucleotides per bit are different.

The system described herein utilizes libraries of oligos to synthesize DNA strands or genes. The system includes a first library of oligos that are referred to herein as "symbols" and a second library of oligos that are referred to herein as "linkers." in general, when a symbol is used in synthesizing a data storage gene, the term "symbol" is used to represent an oligo that has a bit pattern.

As seen from above, longer chain oligos (symbols and/or linkers) encode more data. Longer chains lengths, however, may be proportional to synthesis time. To decrease the time to synthesize longer chains, larger starting oligos can be used in the libraries. For example, if the library has symbols that are 8 base pairs long, the system can store 16 bits per symbol. Having a DNA symbol library with larger symbols speeds up the synthesis time, but the number of symbols may not scale well. For symbols that are 8 base pairs long, the system would have 65,536 symbols in the library. For symbols that are 9 base pairs long, the system would have 262,144 symbols in the library. For symbols that are 10 base pairs long, the system would have 1.048.576 symbols. As shown in Table 2, the symbol library size is 4 to the power of the base pairs; for example, the library size is 4^(base pairs per symbol).

TABLE 2

| Base Pairs per Symbol | Number of Bits per Symbol | Size of Symbol Library |
|---|---|---|
| 1 | 2 | 4 |
| 2 | 4 | 16 |
| 3 | 6 | 64 |
| 4 | 8 | 256 |
| 5 | 10 | 1024 |
| 6 | 12 | 4096 |
| 7 | 14 | 16,384 |
| 8 | 16 | 65,536 |
| 9 | 18 | 262,144 |
| 10 | 20 | 1,048,576 |

To form a DNA strand or gene of sufficient length to store usable amounts of data, multiple DNA symbols (for example, at least two, often at least ten, more often at least twenty) from the library are combined. To control the connection of the symbols to obtain the desired nucleotide sequence, the symbols are provided with overhanging ends.

In accordance with this disclosure, a linker library is provided, which is a collection of "linking" oligos that will attach to the first end and to the second end of all the symbols in the symbol library, thus providing a controlled connection mechanism for the symbols. The linkers are oligos having at least one overhanging end complementary to an overhanging end of the symbol; the linker oligos can be shorter than the symbol oligos. With these complementary linkers, the symbols assemble in the correct order to form the final data storage gene. As used and described herein, a DNA storage gene is a collection of DNA symbols connected by linkers. In some implementations, the term "gene" is used to refer to the DNA storage gene. With the library of symbols and the library of linkers, long strands or genes can be made, such as for data storage.

The rate of synthesis of the gene depends on the number of nucleotide pairs in the symbols and the linkers. If the linkers have three base pairs, the system can combine 63 symbols at one time to create a 126 byte data storage gene that uses two acts. If the linkers have five base pairs, the system can combine 1023 symbols at one time to create a 2048 byte data storage gene that uses two acts. Thus, the linker library provides a mechanism for readily combining the symbols in the desired order to form the data storage gene.

Summarized, for a gene that is 64 symbols long, the following methods can be used to synthesize the gene.

Method #1: Act 1: mix 64 oligo symbols with their corresponding linker oligos from the linker library which contains 64 pairs of linkers. Act 2: mix all 64 oligos to form the gene.

Method #2: Act 1: mix 16 oligo symbols with their corresponding linker oligos from the linker library which contains 16 pairs of linkers. Act 2: mix each of the oligos from act 1 together to form a 16 symbol oligo. Act 3: repeat acts 1 and 2 three more time with 32 additional symbols. Act 4: after act 3, there are 4 oligos that are each 16 symbols long; mix these individually with 4 pairs of linkers. Act 5: combine all 4 oligos from act 4 to create a gene that is 64 symbols long. The repeats of act 1 and act 2 (described in act 3) can be done in parallel.

As can be seen, Method #2 employs more acts, but also utilizes 16 linkers versus the 64 linkers for Method #1.

Similarly, for a gene that is 60 symbols long, the following methods can be used to synthesize the gene.

Method #1: Act 1: mix 60 oligo symbols with their corresponding linker oligos from the linker library which contains 60 pairs of linkers. Act 2: mix all 60 oligos to form the gene.

Method #2: Act 1: mix 15 oligo symbols with their corresponding linker oligos from the linker library which contains 15 pairs of linkers. Act 2: mix each of the oligos from act 1 together to form a 15 symbol oligo. Act 3: repeat acts 1 and 2 three more times with 30 additional symbols. Act 4: after act 3, there are 4 oligos that are each 15 symbols long; mix these individually with 4 pairs of linkers. Act 5: combine all 4 oligos from act 4 to create a gene that is 60 symbols long. The repeats of act 1 and act 2 (described in act 3) can be done in parallel.

As can be seen, Method #2 employs more acts, but also utilizes 15 linkers versus the 60 linkers for Method #1.

With such methods, the numbers of linkers in the linker library can be reduced or limited by utilizing the same overhanging ends and including additional acts in the synthesis method. For example, a 15 linker-pair linker library reused twice will give a 15×15=225 symbol gene in four acts. A 16 linker-pair linker library reused twice will give a 16×16=256 symbol storage gene in four acts; at 2 bytes per symbol, the result is a 512 byte storage gene. As another example, a 64 linker-pair linker library reused twice will give a 64×64=4096 symbol storage gene in four acts; at 2 bytes per symbol, the result is an 8192 byte storage gene. As yet another example, a 4096 linker-pair linker library reused twice will give a 4096×4096=16,777,216 symbol storage gene in four acts; at 2 bytes per symbol, the result is a 33 megabyte storage gene.

In the example provided above, the system has 65,536 DNA symbols in the symbol library, each which is 16 bits on 8 base pairs. Once a data storage gene is formed, the data stored therein, by the sequence of the nucleotides, can be read by known sequencing methods. However, during reading of the data storage gene, errors may occur. By reading one nucleotide base incorrectly, two bit errors are obtained. For example:

Correct read: AATTAGTC translates to 0000111100011O

Incorrect read: TATTAGTC translates to 1100111100011O

To inhibit incorrect reading, an error correction can be built in to the DNA symbols. With the system described herein, extra base pairs can be added to the symbols to create a Hamming Code; adding extra pairs to the symbols does not increase the size of the library or slow down the synthesis of the data storage gene. It is noted that the extra base pairs may, however, decrease the read speed of the gene. Hamming Codes are well known in other applications.

While the synthesis methods described above can be implemented in any manner, such as utilizing various reactors, flasks or beakers, for example, the methods are also particularly suited to be performed as a microfluidic lab-on-a-chip process. In an exemplary embodiment, the lab-on-a-chip is operably and fluidically connected to the symbol library, with each symbol retained in a well or other liquid storage compartment. Similarly, the lab-on-a-chip is operably and fluidically connected to the linker library, with each linker retained in a well or other storage compartment. In some designs, there may be at least 10,000 wells for the symbols, or at least 20,000, or at least 30,000 wells, or at least 65.000 wells. Additionally or alternately, there can be at least 10 wells for the linkers, or at least 15 wells, at least 30 wells, or at least 60 wells.

By a technique such as applying a voltage differential on the platform, the dispensed reagents, such as symbols and linkers, for example, are moved on (across) the platform and mixed in the desired acts. All mixing of the oligos (e.g., symbols and linkers) can be done on the platform; alternatively or additionally, a dedicated mixing station may be used for one or more of the joining acts, for example a station that provides heat and/or agitation. In some implementations, the platform may include a controllable reaction facilitator, such as an LV light source, heater or mechanical agitator. Additionally, the final mixing station may include a voltage source that can be used to align the completed gene to aid in collection.

One suitable (physical) size for a lab-on-a-chip is about 20 millimeters (mm) by 20 mm, which is compatible to an 8 inch wafer and could have 785,000 array elements, each array element or cell having controllable voltage independently applied thereto. In some implementations, each well or other storage compartment for the oligos (symbols or linkers) is 10× the size of an array element or cell. This would provide 66,560 wells and leave 119,000 arrays for transport and mixing of the symbols and linkers on the platform.

Figure 1B:
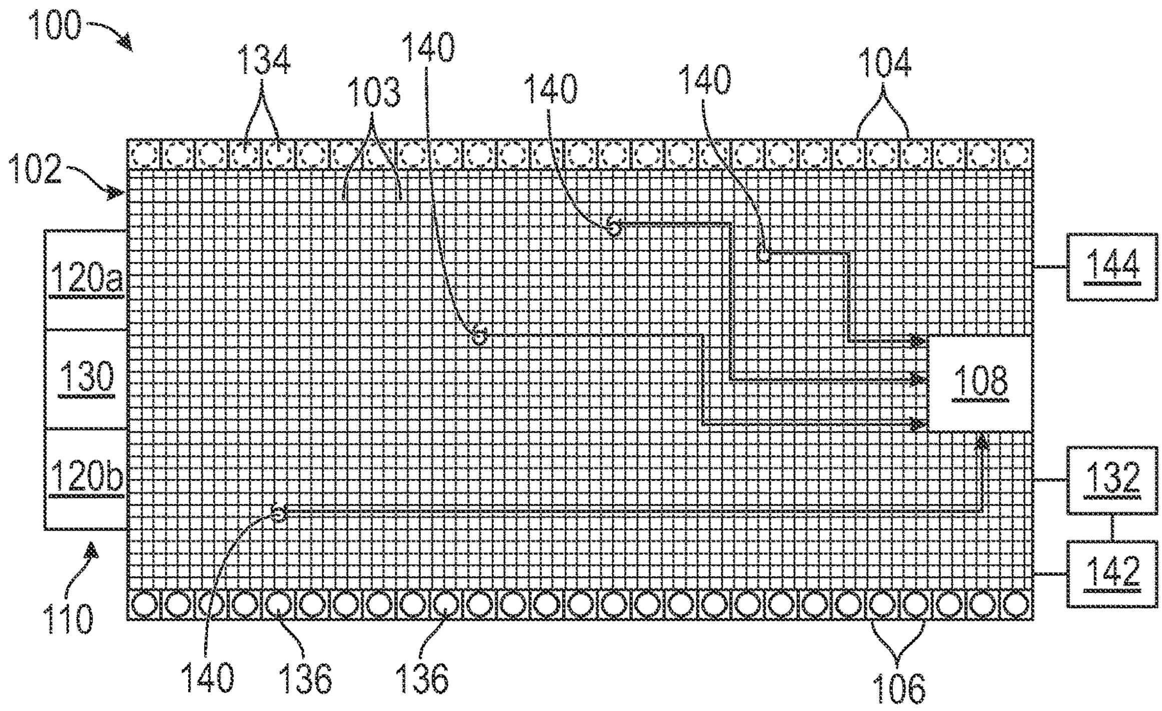
FIG. 1B is a schematic diagram of the lab-on-a-chip showing another stage in the method.

FIGS. 1A and 1B illustrate two stages of an example synthesis method. These figures illustrate an example of a lab-on-a-chip to make a 2048 byte storage gene using the methods of this disclosure. In an exemplary embodiment, lab-on-a-chip 100 has a digital microfluidic (DMF) platform or working surface 102 having numerous array elements or cells 103, each configured for independently receiving a voltage. While each cell 103 is configured as a square electrode, the electrodes may not be square; for example, cells 103 could be triangular or hexagonal.

The chip 100 includes a plurality of wells 104 for the oligo symbol library, each well 104 retaining one symbol 134. The chip 100 also includes a plurality of wells 106 for the oligo linker library, each well 106 retaining one linker 136. Although the figures show the wells 104 and the wells 106 on opposite sides of the platform 102, because there may be significantly more symbol wells 104 than linker wells 106, the wells 104, 106 may be arranged on the chip 100 in any order. To make a 2048 byte gene, 65,536 symbols 136 are present in the wells 104 and 1024 linker pairs (thus, 2048 linker oligos) are present in the wells 106. The chip 100 also has a final mixing location 108 for the final mixing or synthesis act for the data storage gene.

In a first stage, partially shown in FIG. 1A, all 1024 linker pairs are combined with their corresponding 1024 (of the 65,536) symbols on the platform 102; for clarity of understanding and to simplify the figure. FIG. 1A shows four combinations of three symbols 134 with eight linkers 136, although all linkers 136 and symbols 134 may eventually be combined on the platform 102. Each of these combinations is depicted as a fused vesicle 140. The selected symbol 134 is moved via electrophoresis by the application of voltage on the platform 102 to meet and combine with the appropriate linkers 136 (also moved via voltage on the platform 102) to result in fused vesicles 140.

Droplet motion can be accomplished via electrophoresis, optical tweezers, magnetic techniques, dielectrophoresis techniques, and acoustic techniques, for example. The droplets of chemicals are contained inside polymersomes, liposomes or similar vesicles that serve to prevent the droplets from contaminating the surface of the grid platform 102 on which they are being moved. Additionally, encapsulated vesicles prevent the chemicals from evaporating and slow degradation. Since the reactants are held in a spherical form with a small surface area per volume ratio, reduced voltages are sufficient for motion by electrophoresis, dielectrophoresis, and/or electrowetting. Charges can also be added to the polymersome material to make them more responsive to electric fields.

Generally, polymersomes are hollow spheres made of diblock copolymers. In exemplary embodiments, reactants such as symbols and linkers are configured as liquid droplet(s) encapsulated within a polymersome wall. Polymersomes are controllable in size, ranging from about 100 nanometers (nm) to a few microns in diameter. Polymersomes can be stably prepared by a wide range of techniques common to liposomes. Suitable processes include film rehydration, sonication and extrusion to generate vesicles of about 100 nanometers (nm) from polyethyleneoxide-polyethylethylene (PEO-PEE) or polyethyleneoxide-polybutadiene (PEO-PBD). A PEO-PEE diblock has been shown to self-assemble into membranes that are much thicker and tougher than any natural lipid membrane. Polymersomes can be induced to release their contents due to a variety of stimuli including light, electric fields, hypoxia, and the present of certain enzymes, for example. The polymersome wall can also be altered to allow for alternative droplet control methods (for example by adding magnetic nanoparticles to allow for magnetic attraction and/or levitation).

In an exemplary embodiment, the vesicles containing the droplets are created from polymers that allow the vesicles to fuse under certain conditions, mixing their contents without contaminating the surface of platform 102. The size of each vesicle is controlled; for example, uniformly sized chemical droplets can be moved reliably by calibrated voltages. An example of a suitable polymer is polyethyleneoxide-polyethylethylene, which allows polymersome fusion when the polymersomes are exposed to ultraviolet light. Such exposure creates ceramide or other double-chained lipids in the vesicle membrane to induce spontaneous vesicle fusion when vesicles 134, 136 come into contact with each other to form fused vesicle 140.

As illustrated in FIG. 1A, a vesicle mover 144 (shown schematically) is used to control the position of vesicle 134, 136, 140 on platform 102. In exemplary embodiments, the vesicle mover 144 is configured as a cell voltage application system, optical tweezers, a magnet, or acoustic wave generator. Other suitable vesicle motion methods include the use of electrophoresis, dielectrophoresis, electrowetting, and/or other methods to move one or more symbol vesicles

134 from reservoirs 104 containing many vesicles to a chosen array cell 103 or position on platform 102, where the fusion will occur. Then, one or more linker vesicles 136 is brought to the same cell location 103, where it will be fused with the first vesicle 134, combining their contents in fused vesicle 140 and allowing the operator to perform chemical reactions on a femtoliter scale without evaporation or cross-contamination of droplets.

In an exemplary embodiment, two or more vesicles (which may be polymersomes) 134, 136 containing different agents are combined into each other forming one large vesicle or polymersome 140 containing all of the agents of the polymersomes that formed it. In an exemplary embodiment, heating of the fused polymersome 140 allows for a breakdown in the walls of the reagent polymersomes 134, 136 to an extent that allows the contents to mix. Removal of the heat source leads to cross-linking of the polymersome wall material around the combined contents, thus resulting in the fused polymersome 140. Thus, the resulting chemical reactions take place inside that larger polymersome 140 instead of in the surrounding environment. This prevents those agents from contaminating the platform 102.

By placing a vesicle 134, 136, 140 onto the electrode grid of platform 102, voltages can be applied to specific grid points or cells 103, causing the vesicle 134, 136, 140 to move to a grid point or cell 103 with a high voltage. So by sequentially applying voltages to different electrode cells 103 on the grid platform 102, vesicles can be moved from cell to cell. As shown in FIGS. 1A and 1B, multiple vesicles 134, 136, 140 can then be brought to a location and combined into a larger vesicle containing the mixed contents of the constituent vesicles.

The encapsulation of liquid in vesicles avoids contamination of platform 102. For example, with free-flowing liquid, droplets leave behind trails of their fluids as they move across the grid platform, potentially contaminating electrode squares. If a different droplet later moves across one of those squares, it can pick up some of the fluid left in the trail of the first droplet, which can cause unwanted chemical reactions to occur. By containing the fluids in vesicles, this cross-contamination of droplets can be avoided and desired chemical reactions occur. Containing the droplets inside vesicles also prevents them from evaporating and lowers the voltage to be applied to the electrode grid platform 102 to manipulate them.

In an exemplary method, optical tweezers are used to position vesicles 134, 136 made from polyethyleneoxide-polyethylethylene. The optical tweezers would position two of these vesicles 134, 136 in the same location 103 and then a reaction facilitator 132 (illustrated schematically) such as an UV light source would be used to induce the fusion of the vesicles to form fused vesicle 140. In an exemplary method, the vesicles 134, 136 fuse spontaneously upon exposure to UV light via the double-chained lipids contained in their membranes. Other suitable reaction facilitators 132 include heaters and mechanical agitators, for example.

When writing DNA strands, several of the chemistry acts can be enhanced by heating the chemical agents to facilitate reactions. Thus, one or more cells 103 can be equipped with or connected to a reaction facilitator 132 configured as an electronic heater. The vesicles 134, 136 can be placed at this location 103, and the heater can be turned on for certain reactions. Several electronic methods can be used to apply heat; for example, sending an electric current through a resistance to a location of cell 103 would cause it to heat up, or a Peltier cooling/heating device could be placed there to control the temperature.

DNA can store data in a far more volume efficient way than current hard drive data storage methods allow, but this is not true if bulk chemical reactions are used to create the strands. By using femtoliter sized droplets to write data into DNA, the described apparatus and method allow 1 terabyte of data to be stored in a volume of a little over a milliliter. It is beneficial that this volume is very small; every time data is written into a strand of DNA, that writing uses a reaction since the data being stored each time is unique. Thus, the smaller the volume of the reactant droplets, the more efficiently data can be stored.

In a second stage, shown partially in FIG. 1B, all 1024 fused drops 140 (which have a symbol 134 with two linkers 136) are moved via voltage or optical tweezers to the final mixing location 108, where they self-assemble to form the 2048 byte data storage gene; for clarity of understanding and to simplify the figure. FIG. 1B shows the four fused vesicle combinations 140 moving to the final mixing location 108, although all combined linkers 136 and symbols 134 will eventually move to the final mixing location 108. It is noted that a particular symbol 134 and/or particular linkers 136 may be used multiple times to form the eventual gene. Additionally, a particular symbol 134 can be combined with different linkers 136 and vice versa.

In an exemplary embodiment, chip 100 also includes a PCR region 110 to replenish the linker and/or symbol libraries. The PCR region 110 includes wells 120*a*, 120*b* for PCR chemicals and a PCR station 130. Naturally, the symbols 134 and linkers 136 are depleted as storage genes are synthesized. Occasionally, the symbols 134 and linkers 136 may be replenished; the PCR region 110 allows for such replenishment of the chip 100. Depending on the symbols 134 and the linkers 136 used (particularly, the overhanging ends of the symbols and the linkers), the same PCR chemistry set can be used for both the symbol and linker libraries. In some implementations, a few (for example, one, two, three, or four) PCR chemicals are used.

Because numerous symbols 134 and linkers 136 are to be moved to each other, to the final mixing location 108, and to the PCR region 110, many of which are moved or moving simultaneously, numerous paths are used. For example, at a point in time, one hundred symbols 134 and 200 linkers 136 (for example, 16 linker pairs, some of which are used multiple times) may be moving on the platform 102. In most implementations, these paths are not constrained by channels or other physical or set paths on the platform 102, but movement of the vesicles on the platform 102 is controlled merely by the applied voltage or by optical tweezers. It is noted that due to the large number of paths, a very detailed and complicated traffic map directed by controller 142 may be used to prevent unintentional combinations or contamination.

Figure 2:
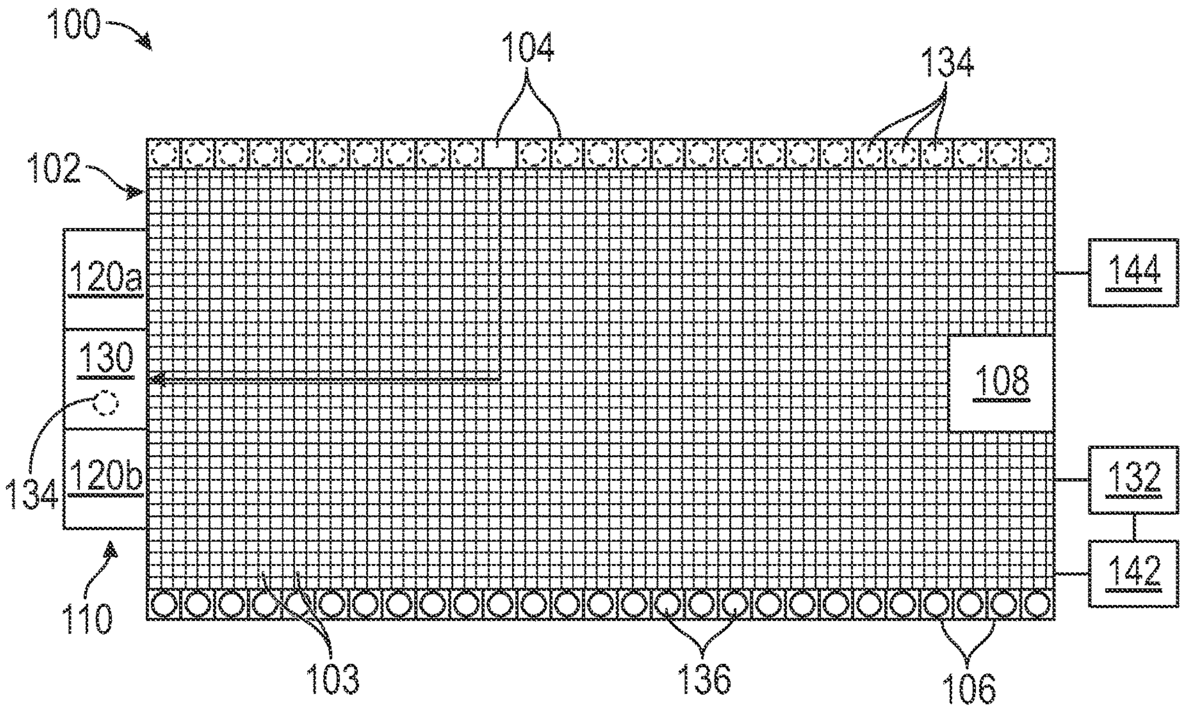
FIG. 2 is a schematic diagram of a lab-on-a-chip showing a polymerase chain reaction process.

FIG. 2 illustrates use of the PCR region 130 to replenish a symbol 134. A symbol 134 is shown being moved from its respective well 104 to the PCR station 130. Appropriate PCR chemicals (e.g., primers, DNA polymerase, free nucleotides) are added from the chemical wells 120*a*, 120*b* to the PCR station 130 to synthesize additional copies of the symbol 134. The chip 100 can invoke a heater to denature the symbol or linker being synthesized. Additionally, the chip 100 can include an appropriate cooling source for annealing primers to the denatured symbol or linker. The PCR station 130 is configured to include all chemicals to automatically and autonomously replenish the symbols 134 and linkers 136.

In a PCR process, two primers are used for each oligo, one primer for each end. By having all the oligos in the symbol library have the same beginning and same end (TT and GG overhanging ends, for example), the same PCR chemistry (for example, the same two primers) can be used for all symbols in the library. In an example, however, where half of the oligos in the linker library have the same first end and the other half of the oligos in the linker library have another same first end; the second end is different. For the linkers, the same PCR chemistry (for example, the same primer) can be used for one end of all the linkers; the second end of the linkers will use a different primer.

Figure 3:
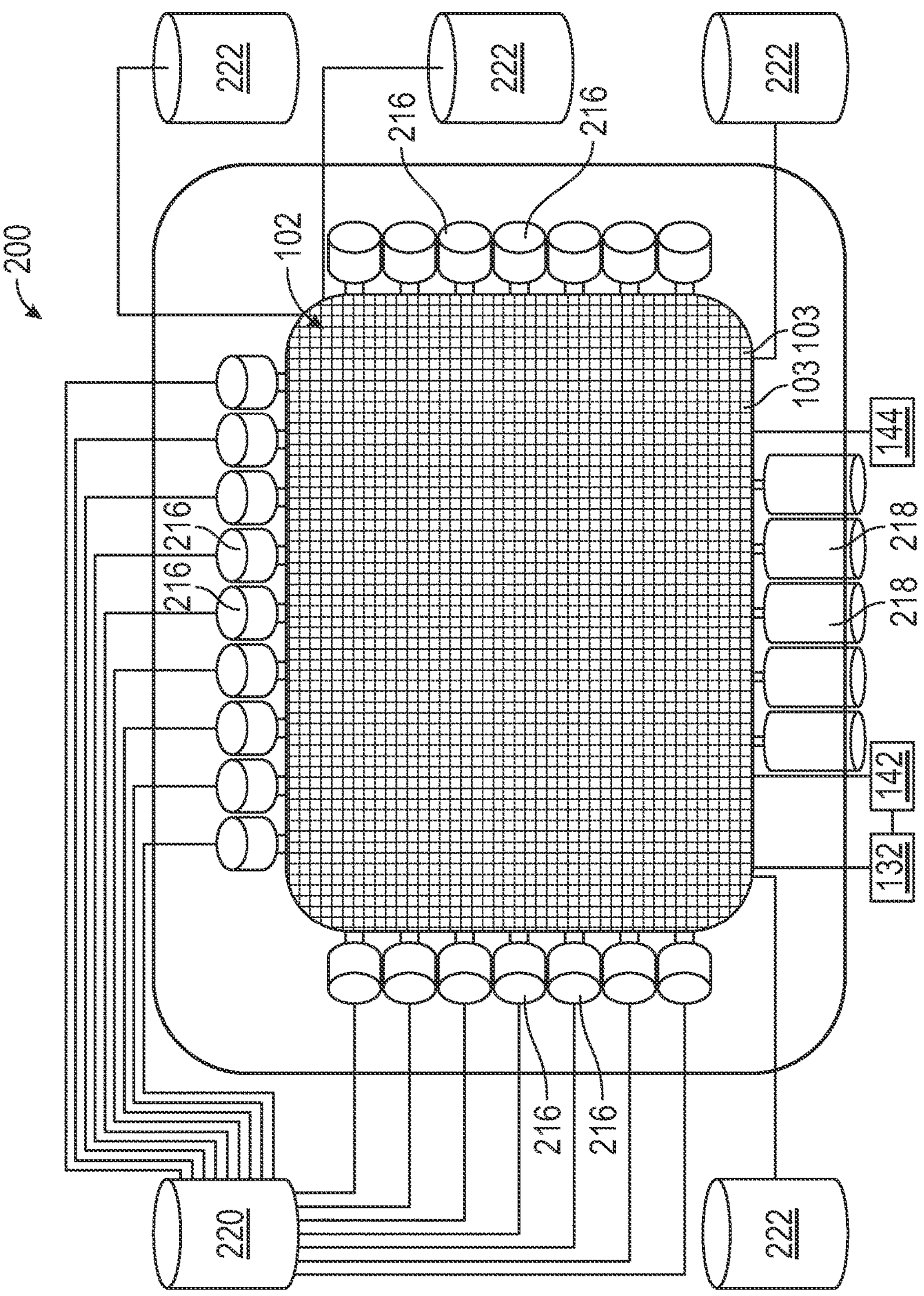
FIG. 3 is a schematic diagram of another exemplary microfluidic lab-on-a-chip.

FIG. 3 is a schematic diagram of an exemplary embodiment of a microfluidic chip 200 configured for more general laboratory reactions, not just those related to DNA synthesis. In an exemplary embodiment of chip 200, a DMF grid platform 102 has voltage array elements or cells 103 for very droplet motion control. Each array element 103 has independently controllable voltage applied thereto, to facilitate motion of a vesicle across the platform 102 by applied voltage. In an exemplary embodiment, a portion of the perimeter of platform 102 houses a large number of small reagent reservoirs, wells or liquid compartments 216. In an exemplary embodiment, each of the small reservoirs 216 has a volume of about 500 microliters. In an exemplary embodiment, the system includes a plurality of medium reservoirs 218, for more commonly used reagents, each of which has a larger volume capacity than a small reservoir 216. In an exemplary embodiment, some of the plurality of small reservoirs 216 are fluidly connected to a large water reservoir 220. In an exemplary embodiment, a plurality of other large reservoirs 222 is provided, each configured to contain a liquid such as silicone oil, or cleaning solution, for example. Moreover, large reservoirs 222 may be connected to receive material from platform 102 such as oil waste or aqueous waste.

The described methods and apparatuses 100, 200 are not limited to DNA synthesis; they would be useful for any chemistry to facilitate many similar, but individual reactions. Suitable applications include DNA data storage, personalized medicine creation, pharmaceutical research, or screening a biological sample for many biomarkers simultaneously, for example. In either the electrophoresis or optical tweezers method (optical tweezers can be used on a surface other than a DMF platform), the motions of the vesicles 134, 136, 140 can be controlled by a computer program operated on controller 142 that will determine the order in which vesicles are to be combined in order to write a certain strand of DNA or obtain a desired reaction result.

Figure 4:
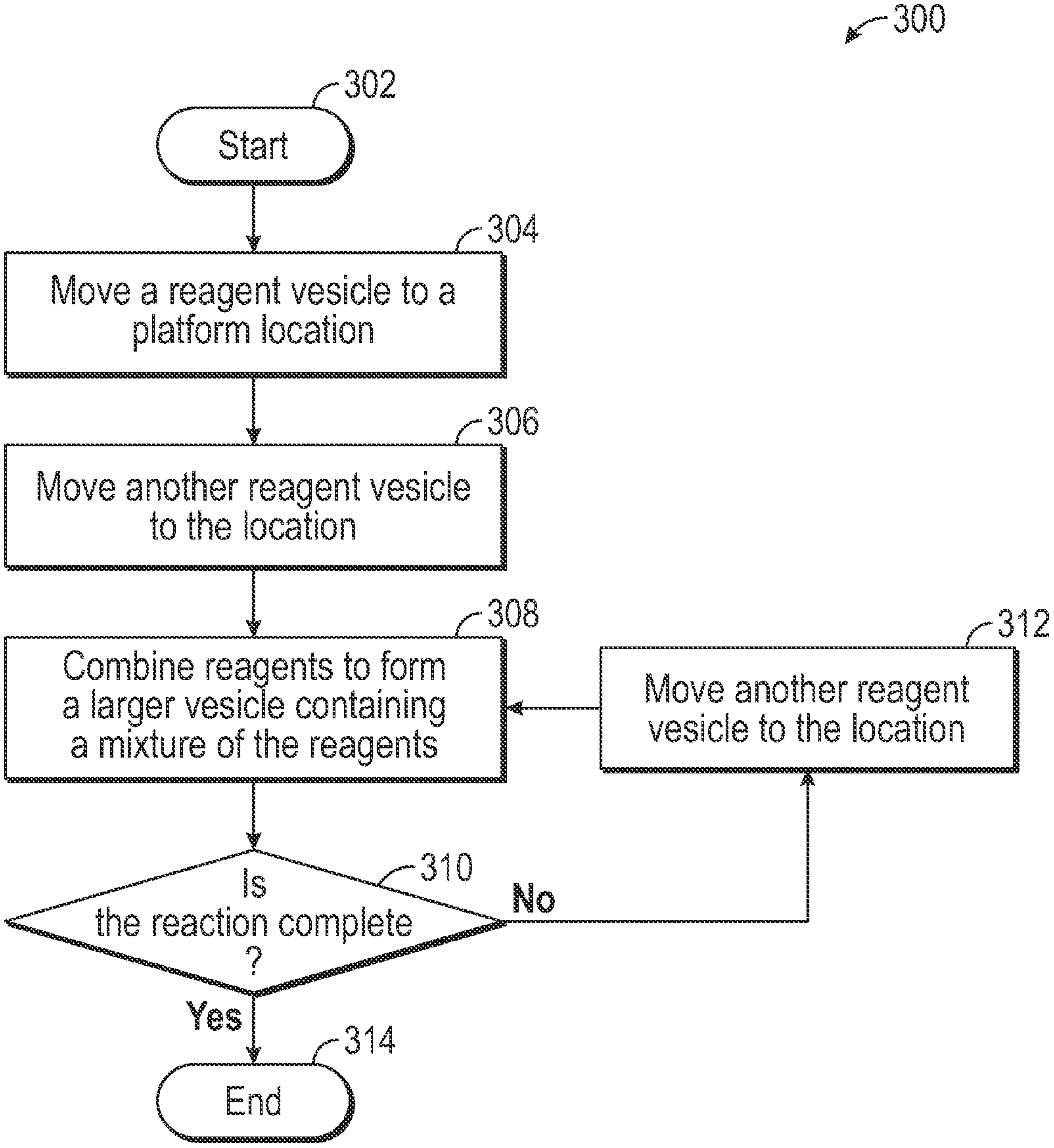
FIG. 4 is a flow chart showing an exemplary method of performing a reaction on a lab-on-a-chip.

FIG. 4 is a flow chart illustrating an exemplary method for use of the described system. Method 300 starts at 302. At 304, a reagent vesicle is moved (such as by a user) to a platform location. Either the DNA lab-on-a-chip 100 or the general lab-on-a-chip 200 can be used as the platform. The reagent vesicle can originate from symbol well 104, linker well 106, or any of the reservoirs 216, 218, 220, for example. The reagent vesicle is moved to a platform location that can be designated as a cell 103 of a digital microfluidic platform 102. At 306, another reagent vesicle is moved from one of the wells or reservoirs to the same location as the first reagent vesicle. At 308, the vesicle walls of the reagent vesicles are fused, thereby forming a larger vesicle containing a mixture of the reagents. Inquiry 310 asks if the desired reaction is complete. If yes, the method ends at 314. If no, the method moves to 312, wherein another reagent vesicle is moved to the location. Action at 308 is repeated to combine this added reagent with the other formed vesicle to form yet another larger fused vesicle containing a mixture of all of the reagents brought to that location. While an exemplary embodiment describes that a single vesicle is moved in each act, it is also contemplated that in any act, several reagent vesicles can be moved to a location. Moreover, the method may not be completed all at a single location. For example, as shown in FIG. 1A, several fused vesicles 140 are obtained in separately performed acts 308. Then as shown in FIG. 1B, the fused vesicles 140 are themselves moved to a final mixing location 108 for another combination act 308 at a different location.

This specification and examples provide a complete description of the structure and use of exemplary implementations of the invention. The above description provides specific implementations. It is to be understood that other implementations are contemplated and may be made without departing from the scope or spirit of the present disclosure. The above detailed description, therefore, is not to be taken in a limiting sense. While the present disclosure is not so limited, an appreciation of various aspects of the disclosure will be gained through a discussion of the examples provided.

Unless otherwise indicated, all numbers expressing feature sizes, amounts, and physical properties are to be understood as being modified by the term "about." whether or not the term "about" is immediately present. Accordingly, unless indicated to the contrary, the numerical parameters set forth are approximations that can vary depending upon the desired properties sought to be obtained by those skilled in the art utilizing the teachings disclosed herein. As used in this specification and the appended claims, the term "or" is generally employed in its sense including "and/or" unless the content clearly dictates otherwise.

Spatially related terms, including but not limited to, "bottom," "lower", "top", "upper", "beneath", "below", "above". "on top". "on." etc., if used herein, are utilized for ease of description to describe spatial relationships of an element(s) to another. Such spatially related terms encompass different orientations of the device in addition to the particular orientations depicted in the figures and described herein. For example, if a structure depicted in the figures is turned over or flipped over, portions previously described as below or beneath other elements would then be above or over those other elements.

Since many implementations of the invention can be made without departing from the spirit and scope of the invention, the invention resides in the claims hereinafter appended. Furthermore, structural features of the different implementations may be combined in yet another implementation without departing from the recited claims.

The illustrations of the embodiments described herein are intended to provide a general understanding of the structure of the various embodiments. The illustrations are not intended to serve as a complete description of all of the elements and features of apparatus and systems that utilize the structures or methods described herein. Features described with respect to any embodiment also apply to any other embodiment. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description. All patent and patent application documents mentioned in the description are incorporated by reference.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments employ more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. For example, features described with respect to one embodiment may be incorporated into other embodiments. Thus, to the maximum extent allowed by law, the scope of the present disclosure is to be determined by the broadest permissible interpretation of the following claims and their equivalents, and shall not be restricted or limited by the foregoing detailed description.

The invention claimed is:

1. A microfluidic system comprising:

a fluidic platform comprising a plurality of electrode cells;

a vesicle mover configured to move first and second vesicles to a selected cell of the plurality of electrode cells, the first vesicle encapsulating a first reagent and the second vesicle encapsulating a second reagent; and a reaction facilitator operably connected to the selected cell.

2. The system of claim 1 wherein the reaction facilitator is a heater.

3. The system of claim 1 wherein the reaction facilitator is an ultraviolet light source.

4. The system of claim 1 wherein the reaction facilitator is an agitator.

5. The system of claim 1 wherein the vesicle mover comprises optical tweezers.

6. The system of claim 1 comprising a plurality of reservoirs, wherein one of the plurality of reservoirs is configured to contain the first or second vesicle.

7. The microfluidic system of claim 1 wherein:

the fluidic platform comprising the plurality of electrode cells comprises a hydrophobic fluidic platform comprising the plurality of electrode cells operably connected to a voltage source and a controller for the voltage source; and the reaction facilitator comprises a heater on the hydrophobic fluidic platform configured to fuse the first and second vesicles, the first vesicle encapsulating a first DNA precursor and the second vesicle encapsulating a second DNA precursor, wherein the fusing combines the first and second DNA precursors.

8. The system of claim 7 comprising a plurality of DNA symbol wells, wherein one of the plurality of symbol wells is configured to contain the first vesicle.

9. The system of claim 7 comprising a plurality of DNA linker wells, wherein one of the plurality of linker wells is configured to contain the second vesicle.

10. The system of claim 7 wherein at least one of the first or second vesicles comprises a polymersome.

* * * * *